(12) United States Patent
Corpus

(10) Patent No.: US 8,554,609 B1
(45) Date of Patent: Oct. 8, 2013

(54) PAPERLESS COUPON CARD

(75) Inventor: Thomas A. Corpus, Strongsville, OH (US)

(73) Assignee: Corpus & Company, Strongsville, OH (US)

(*) Notice: Subject to any disclaimer, the term of this patent is extended or adjusted under 35 U.S.C. 154(b) by 1058 days.

(21) Appl. No.: 12/047,760

(22) Filed: Mar. 13, 2008

Related U.S. Application Data

(60) Provisional application No. 60/895,329, filed on Mar. 16, 2007.

(51) Int. Cl.
*G06Q 30/00* (2012.01)
*G06Q 40/00* (2012.01)

(52) U.S. Cl.
USPC .............................................. 705/14; 705/35

(58) Field of Classification Search
USPC ................................. 705/26, 14, 35
See application file for complete search history.

(56) References Cited

U.S. PATENT DOCUMENTS 4,882,675 A * 11/1989 Nichtberger et al. ...... 705/14.35
2007/0203792 A1 * 8/2007 Rao ................................ 705/14

OTHER PUBLICATIONS

Yakabuski, Konrad; "French immersion: Paul Delage Roberge set Quebec abuzz by pampering his patrons . . . "; Report on Business Magazine; Feb. 2001.*
Bader, Nancy; "No more coupon clipping: David Humble's Advanced Promotion Technologies . . . "; Florida Trend; Jun. 1993.*
Rroguski, Giant Eagle's 'E-Offers' take the clipping out of coupons, "blog.cleveland.com", Nov. 29, 2007.

* cited by examiner

*Primary Examiner* — Edward Chang
(74) *Attorney, Agent, or Firm* — Pearne & Gordon LLP

(57) ABSTRACT

A paperless coupon system and method are provided that facilitate encouraging and rewarding consumer use of coupons, and decreasing the costs associated with coupon distribution and redemption for commercial entities. The system and method involve issuing a machine readable article such as a card, for example, to a user or offeree and registering the card on a website or other communication network to associate the card with an offeree user account, generating and displaying paperless coupons from which the user or offeree can select, and allowing the user to link their selected coupons to their machine readable article and redeem them in an electronic and automatic manner at, and/or after purchase of the related item(s) through their use of the card during the purchase transaction.

20 Claims, 1 Drawing Sheet

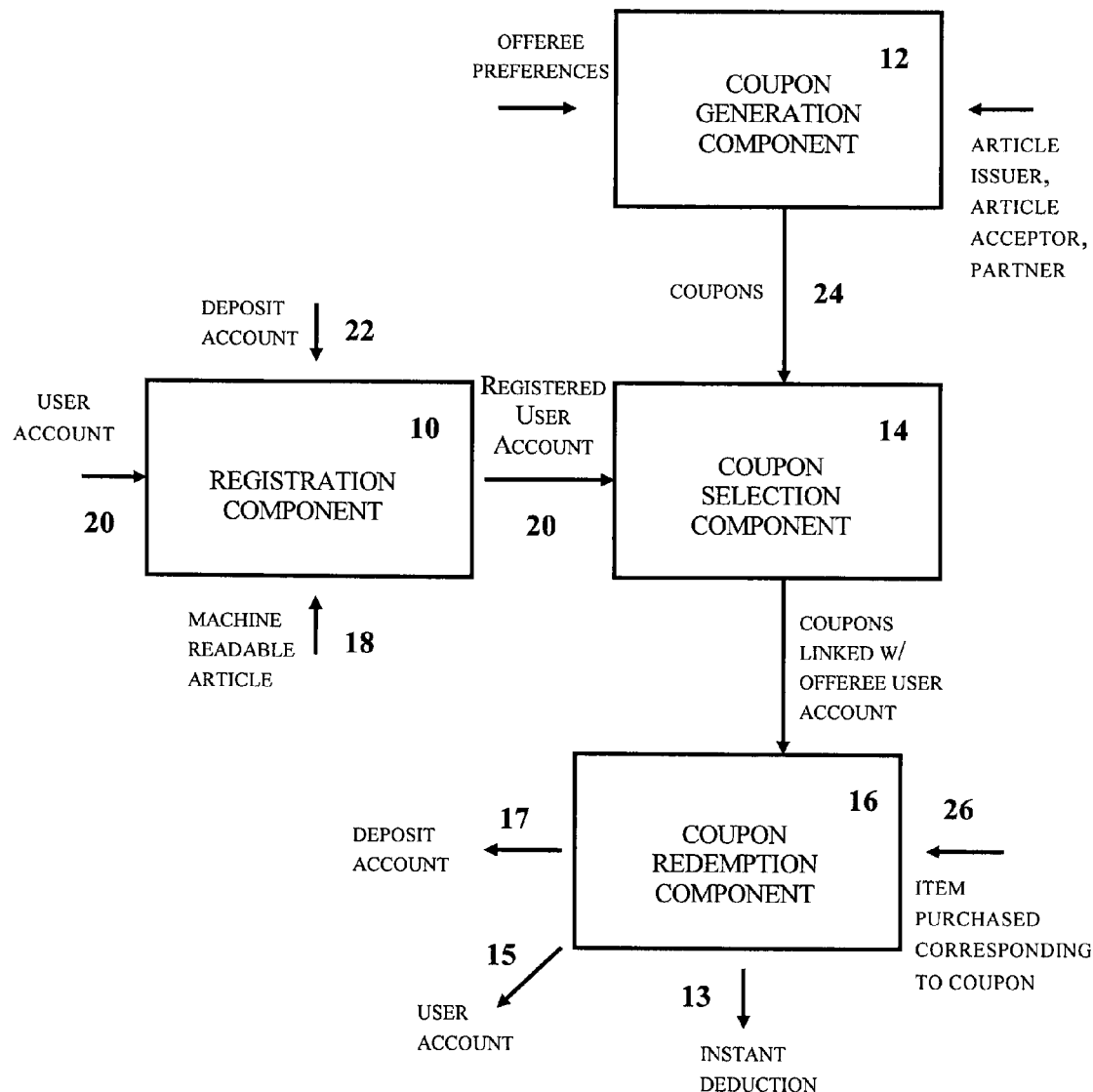

PAPERLESS COUPON CARD

CROSS-REFERENCE TO RELATED APPLICATION

This application claims the benefit of U.S. Provisional Application Ser. No. 60/895,329 entitled PAPERLESS COUPON CREDIT CARD and filed on Mar. 16, 2007, the entirety of which is incorporated herein by reference.

TECHNICAL FIELD

The subject application relates to coupon processing and in particular to an improved coupon processing method that both mitigates the cost associated with the redeeming and handling of various discounts and benefits, and allows for multiple parties to fund the associated discounts and benefits.

BACKGROUND

Over the years, conventional coupon-clipping has evolved due to the rise in use of computers and the Internet. Paper coupons are still available and usually included in newspapers and magazines. Despite the attempts by some retailers to expand into the electronic age with printable or virtual coupons made available on their websites or emailed to their preferred customers, many other retailers remain unsatisfied with traditional coupon or discount schemes and as a result, are sometimes less willing to offer them. One of the primary concerns that many retailers have are the costs involved in processing paper coupons. Electronic or Internet coupons can be more cost efficient however in spite of the surge of computer users in the past decade, there are still many consumers that do not use the Internet or email for personal use. In general, most retailers still have a need to attract new customers or users of their products and services. Therefore, many retailers continue to look for different ways to expand their market share while keeping their current customer base in mind and satisfied.

SUMMARY

The subject application is directed to a paperless coupon system comprising a registration component, a coupon generation component, a coupon selection component, and a coupon redemption component. The registration component registers an offeree (e.g., consumer) machine readable article with an offeree user account, and optionally, registers the offeree user account with a separate offeree deposit account. Separately from the registration component, the coupon generation component generates and/or determines which coupons and benefits to make available to the offeree based on attributes such as, but not limited to, offeree preferences, coupons issued by an issuer of the offeree machine readable article, coupons issued by an acceptor of the offeree machine readable article, and coupons issued by partners of the issuer or the acceptor of the machine readable article (e.g., manufacturers, service providers, payment processors, transaction processors, merchant networks, etc.,).

Using information received from the coupon generation component, the coupon selection component displays the coupons and benefits, and allows the offeree to link the coupons and benefits with the offeree user account. During a sale or purchase of items, the redemption component reads the coupons linked to the offeree user account via the offeree machine readable article and identifies items being purchased that correspond to coupons linked to the offeree user account. The redemption component then applies the corresponding coupons to a purchase of the items. The coupons can be applied in various manners. For example, the coupons may be redeemed instantaneously as a deduction in price of the item, as a credit to the offeree user account, or as a deposit into the offeree deposit account.

The present invention is also directed to a method of providing paperless coupons, and/or allowing for the offering of the combination of both paperless and paper coupons. The method requires issuing to an offeree a machine readable article and registering the machine readable article with a first offeree user account. Optionally, the offeree user account may also be registered with a separate offeree deposit account. The method further requires generating a plurality of paperless coupons, some of which may also have a corresponding paper coupon, based on attributes comprising offeree preferences, coupons issued by an issuer of the offeree machine readable article, coupons issued by an acceptor of the offeree machine readable article, and coupons issued by partners of the issuer of the machine readable article or acceptor of the machine readable article (e.g., manufacturers, service providers, payment processors, transaction processors, merchant networks, etc.,).

A further aspect of the method is directed to displaying the plurality of paperless coupons to the offeree and allowing the offeree to link one or more of the paperless coupons with the first offeree user account. Finally, during a purchase transaction, the method also is directed to reading the paperless coupons from the first offeree user account via the machine readable article and redeeming the paperless coupons that correspond to items being purchased, wherein the redeeming results in any one of the following: an immediate deduction in price of the items, a credit to the first offeree user account, or a deposit into a second offeree user account.

BRIEF DESCRIPTION OF THE DRAWINGS

FIG. 1 is a block diagram of a paperless coupon system comprising a registration component, a coupon generation component, a coupon selection component, and a coupon redemption component in accordance with an aspect of the present application.

DETAILED DESCRIPTION

The subject application involves various schemes for mitigating costs associated with the redemption and handling of coupons, as well as schemes for increasing the value/benefit associated with the coupon. As used herein, "coupon" refers to paperless coupons unless otherwise specified as a paper coupon; and paperless coupons include, but are not limited to, discounts, promotional offers and/or other special offers that are offered electronically.

In the first scheme, an issuer, such as for example a credit card company, a manufacturer, service provider, or retailer, can issue a machine readable article, such as a credit card, a debit card, or charge card, or any other article that allows automatic and paperless redemption of coupons, discounts, or special promotional offers associated therewith. The coupons may be offered by the machine readable article issuer, the coupon acceptor, or a partner thereof (such as a manufacturer or service provider). As used herein, an "acceptor" refers to any entity that accepts the machine readable article and the coupons linked thereon, for example a manufacturer, service provider, retailer, or credit card company. Also as used herein, "partner" refers to any entity that works with the issuer or acceptor within the paperless coupon system, such as, for example, a manufacturer, credit card company, service provider, or retailer, payment processor, transaction processor, or merchant network. A holder (e.g., offeree or consumer) of the machine readable article can register for desired offers, coupons, and other discounts and promotions such as by product or service. Such coupons, discounts, etc. can be redeemed without needing to print paper versions or without needing to input discount codes (when shopping online).

When the registered machine readable article is used to purchase at least one of the registered products or services, the coupon, for instance, can be redeemed automatically by the issuer, e.g. credit card company, and appear as a credit on a later billed statement or deposited into a deposit account, or can be automatically applied to the purchase price. In particular, the credit card company (or other party who processes the transactions) can acknowledge the customer's registered products and/or the customer's registered coupons—via sku tracking in real time, or shortly thereafter via a separate communications process. When the purchase is made, or shortly thereafter, the processing party (e.g., credit card company) can compare the customer's registered coupons with their purchases. The value of the coupon can be realized immediately at the time of purchase without a physical paper coupon or coupon code. For example, the paperless coupon system or method as described herein can communicate with a network, system or other database (e.g., frequent shopper system/database) that tracks and collects data regarding items purchased, returned, etc. by consumers. However, the paperless coupon system or method can also be configured to cooperatively communicate with the retailer's systems to track or collect data regarding items scanned for purchase.

Alternatively, as mentioned above, the value of the coupon can also be realized in the form of a credit on the customer's credit card statement; or the value of the coupon can be deposited into the customer's cash back account or some other designated account. Therefore, the user pays the full amount at the point of purchase and the value of the registered coupon is applied after the purchase is made and the value of the coupon is realized as a credit or as a deposit into a specified account.

On the back end, the processing party or issuer can aggregate the coupons "redeemed" within a given time period (per day or per batch cycle) and then issue (at least) a single payment to the participating retailer (e.g., grocery store) and then also generate a bill to the parties (or vendors) who issued the coupons (e.g., food brand/manufacturer), or partners of these parties. As a result of this streamlined and automated redemption process, costs to retailers and vendors associated with paper coupon printing, distribution, and redemption are substantially reduced. In addition, the credit card company is able to expand their customer base and generate additional fee income through relationships with retailers and/or vendors.

Electronic or paperless coupons may have similar restrictions as their paper counterparts. For example, the paperless coupon may require only one to a customer or may institute that one coupon—whether paperless or paper—is permitted per item purchased during a single transaction. Should a customer redeem a paper coupon for an item for which a paperless coupon was also available to the customer, then at least one of the parties processing the submitted coupons (paper and paperless), processing the payment transaction, and/or monitoring the paperless redemption aspect of the transaction can track the paperless and paper coupon data, items purchased, and the like and can respond in at least one of two ways: (1) not permit the redemption of either the paperless or paper coupon or (2) if both are applied at the point of sale, either coupon value can be charged back to the consumer via their card and/or offeree user account.

Alternatively, both the paper and paperless coupons could be honored depending on which party has agreed to finance them. For example, a manufacturer, service provider or retailer may agree to fund the paper coupon and the issuer, or one of its partners, may agree to fund the paperless version(s). Other variations are possible in order to permit the redemption of paper and paperless coupons for the same item. It should also be appreciated that the paperless coupons can offer greater discounts or incentives to encourage their use over their paper counterparts.

The second scheme is similar to the first except that in this scenario, the customer can redeem/realize the value of the registered coupon immediately at the time of the purchase. Suppose a customer prefers immediate realization of the coupon value rather than waiting for a credit on his/her billing statement, or an associated deposit account. The value of the coupon can be applied to the transaction at the time of the purchase so that the purchase price is reduced by the coupon value. This can be accomplished, for example, by linking the paperless coupon system with a system or database employed by the retailer at the point of sale that tracks and collects data including items purchased.

The third scheme is similar to the first and second, except that in this scenario, the customer can redeem both an electronic version and a paper version of the registered paperless coupon. The combined process of redeeming both paper-based coupons and registered paperless coupons can multiply the value of the coupon (e.g. double coupons, triple coupons, etc), where the potential exists for multiple parties of the process to split the cost to provide these benefits.

Many retailers and manufacturers offer shopping incentives such as double or triple coupons. These can be applied to the customer's transaction regardless of which scheme is chosen for redemption. For example, suppose a retailer offers to double all coupons redeemed. Upon using the registered card to pay, the user can receive the value of the registered coupon as well as the value of the coupon according to the "double coupon" promotion offered by the retailer. Of course, the credit card company, manufacturer, service provider, or issuer may also offer promotions or incentives to attract new users or to entice current account holders. Therefore, the user immediately takes advantage of the various discounts available according to the purchases made. Alternatively, the user can print any electronic coupons, or collect paper versions made available the traditional way via newspapers, and manually redeem them, in addition to redeeming any registered coupons automatically. In either scheme, the registered machine readable article is used to make the purchase in order to properly track and process them.

If desired, verification methods can be employed to ensure that a customer does not redeem the same coupon twice—once electronically and once in paper form, for instance. This can be accomplished in part by various tracking mechanisms. For example, in some configurations, the tracking technique can notify the user at the point of sale that the coupon has been redeemed during a previous transaction, or only allow for the electronically registered coupon or the corresponding paper coupon to be redeemed, but not both. Otherwise, the user may receive a notice of such on his/her billing statement.

It should be appreciated that various aspects of the schemes described above can be combined in any manner to effect a reduction in handling and processing costs of coupons for retailers and vendors without expense or great inconvenience to the customer, or to increase the face value associated with the coupons. For real-time tracking of eligible coupons redeemed per user at the point of sale, the issuer, e.g., credit card company, can communicate with or have access to the user's frequent shopping card/loyalty data. For instance, as items are being scanned, they are associated with the user's frequent shopping card/loyalty data and this data can be communicated to the credit card company's system in real time in order to retrieve eligible coupons for this particular shopper. As a result, the eligible coupons are applied and redeemed at the time of purchase to decrease the total shopping bill by applying the coupons at face value or multiplying their value upon redemption (e.g., doubling or tripling of the value of the coupon) where multiple parties to the process can share in the cost to provide the benefit to the consumer.

Moreover, on the customer-side, transactions can be completed in a seamless manner without having to remember to cut and/or use paper coupons whether shopping online or in a store through the use of this special machine readable article and registration for selected coupons and/or other discount offers. However, the option to redeem paper coupons remains available. Similarly, vendors such as the makers of food and other consumer products can issue and distribute coupons at a reduced cost since the issuance, distribution, and redemption of the discount offers occur electronically through many processing channels already in place in the industry. Costs to the retailer are also mitigated because there is less paper to handle and process. For example, since the coupon redemption occurs electronically in part through use of the machine readable article, they can receive reimbursement or payment for the redeemed discounts in a faster, more efficient manner. The issuer (e.g., credit card company) or an associated third party can process, track, and reimburse the retailer for redeemed coupons. It should be appreciated that the coupons, promotions, and/or other discount offers can be issued from the credit card company, a manufacturer, a service provider, or other company supplying goods or services, or retailers or distributors of such goods and services.

The subject application will now be described in further detail with reference to FIG. 1.

FIG. 1 shows the paperless coupon system of the present invention comprising a registration component 10, a coupon generation component 12, a coupon selection component 14, and a coupon redemption component 16. The registration component 10 registers an offeree machine readable article 18 with an offeree user account 20, and optionally, registers the offeree user account with an offeree deposit account 22. Separately from the registration component 10, the coupon generation component 12 determines which coupons 24 are to be provided to the offeree based on attributes such as, but not limited to, offeree preferences, coupons and promotions issued by an issuer of the offeree machine readable article 18, coupons and promotions issued by an acceptor of the offeree machine readable article 18, and coupons and promotions issued by partners of the issuer or acceptor of the machine readable article 18.

In conjunction with the coupon generation component 12, the coupon selection component 14 displays the coupons presented by the coupon generation component 12 and allows the offeree to link the coupons 24 with the registered offeree user account 20. The redemption component 16 then reads the coupons linked to the offeree user account 20 via the offeree machine readable article 18 and identifies items being purchased 26 that correspond to coupons linked to the offeree user account 20. The redemption component 14 then applies the corresponding coupons to a purchase of the items in various manners. For example, the coupons may be redeemed instantly to reduce the price of the item 13 at the point of purchase. Alternatively or in addition, the whole value of the coupon, a multiple value, or a portion thereof can appear as a credit to the offeree user account 15 or as a deposit into the offeree deposit account 17 after the purchase is completed.

EXEMPLARY SCENARIOS

Example 1

In Conjunction with a Manufacturer's (or Service Provider's) Credit and/or Debit Card A manufacturer issues/offers a credit and/or debit card. A process such as by way of a website, or other accessible network, is established so that the manufacturer's consumers can register for coupons that would be automatically redeemed via the credit card network when the credit card is used to purchase the manufacturer's products. The savings would not be instantaneous, but would appear as a credit on the statement, or deposited into an associated cash back account. The manufacturer, the credit card company, the retailer, or another partner/party to the transaction could fund the coupon redemption. However, the value of the registered coupon is applied automatically and electronically through the use of the registered credit or debit card for payment of the item.

Example 2

In Conjunction with a Manufacturer's Credit and/or Debit Card and a Retailer's System A manufacturer issues/offers a credit and/or debit card. A process, likely through a website or other accessible network, is established so that the manufacturer's consumers can register for coupons that would be automatically redeemed when the credit and/or debit card is used to purchase the manufacturer's products.

The retailer would allow its frequent shopper/loyalty database to synchronize and communicate with the website/database established by the manufacturer and credit card company that manages the registered electronic coupons. This would allow the savings to be automatically applied in real-time to the consumer's bill. Either the manufacturer's database could 'push' its coupon registration information to the retailer's frequent shopper/loyalty database so the coupons could be deducted, or the frequent shopper database can 'call' out to the manufacturer's online coupon database to determine which coupons have been registered for and should be applied to the transaction. Similarly, the manufacturer, credit card company, or a partner to one of the parties of the transaction can fund the coupon redemption. Both the retailer and the manufacturer would realize savings in redeeming the coupons in regards to their handling. Also, as stated previously, the process could allow for people to also redeem paper coupons at the point of sale, and thus multiply the value of their coupon.

Example 3

In Conjunction with a Retailer

A retailer issues/offers a credit card and/or debit card. A process, likely by way of a website, or other accessible network, is established so that the retailer's consumers can register for coupons that would be automatically redeemed when the credit card is used to purchase the products (via the credit card and debit card communication network). Getting the savings to the consumer could be done after the transaction via the credit card or debit card network, where the consumer would realize the savings as a credit on their statement, or as funds deposited into their cash back account. Alternatively, the savings could be automatically be applied at the point of sale via the synchronization of the retailer's frequent shopper/loyalty database, and the website/database established for the registration of electronic coupons as outlined in Example 2.

Example 4

A Broad Market Credit Card

A credit card company issues an e-coupon-oriented credit and/or debit card in which a network of manufacturers and service providers participates to provide the source for the e-coupons. A cooperative process and/or database can be established, such as by way of a website, or other accessible network, for customers or users to register in order to redeem coupons electronically using the e-coupon-oriented card. Once this card is used to purchase those products, the savings would be credited to the consumer after the purchase either as a credit on the statement or deposited into the cash back account.

Alternatively, a network of manufacturers and retailers participate employing the same coupon registration database as described above. However, the coupon registration database is integrated with the retailer's frequent shopper/loyalty databases so that the selected electronic coupons can be identified and the savings and promotions can be realized in real-time at the point of sale. In this exemplary scenario, a significant savings occurs for both the manufacturer and retailer, as coupons can be redeemed and processed without any paper printed, exchanged, or handled by the retailer, and payments from the manufacture can be made electronically to the retailer.

What is claimed is:

1. A paperless coupon system comprising:
   a registration component that registers at least one of a credit, charge, or debit card to an offeree with an offeree user account, and optionally, registers the offeree user account with a separate offeree deposit account;
   a coupon generation component that generates coupons comprising promotional offers and discounts applicable to items or services after they have been purchased without pre-selection by a user, wherein the coupons are issued by at least one of an issuer of the at least one credit, charge, or debit card, by an acceptor of the at least one credit, charge, or debit card, and by partners of the issuer of the at least one credit, charge, or debit card or acceptor of the at least one credit, charge, or debit card, wherein the coupons are sourced by a network of cooperative databases corresponding to multiple manufacturers and service providers; and
   a redemption component comprising at least one of a credit card or debit card communication network that identifies the items or services which have been purchased using the at least one registered credit, charge, or debit card and that applies the corresponding coupon to the items or services after purchase of the items or services in any one of the following manners: as a deposit or credit to the offeree user account; or as a deposit or credit into the offeree deposit account; wherein the coupons linked thereto are for redemption at multiple different retailers where the at least one credit, charge, or debit card is accepted for payment.

2. The paperless coupon system of claim 1, wherein the credit, charge, or debit card is registered on a website or other accessible communication network, via the registration component.

3. The paperless coupon system of claim 1, wherein the coupon display component displays the coupons on-screen via a website, or other accessible communication network.

4. The paperless coupon system of claim 1, wherein coupons are linked on a website, or other accessible communication network, via the coupon selection component.

5. The paperless coupon system of claim 1, wherein the coupons are non-specific to a particular retailer.

6. The paperless coupon system of claim 1, wherein the issuer of the credit, charge, or debit card comprises a financial institution, a credit card or debit card company, a manufacturer, a service provider, or a retailer.

7. The paperless coupon system of claim 1, wherein the acceptor of the credit, charge, or debit card comprises a financial institution, a credit or debit card company, a manufacturer, a service provider, or a retailer.

8. The paperless coupon system of claim 1, further comprising a partner of the issuer of the credit, charge, or debit card or acceptor of the credit, charge, or debit card which comprises a financial institution, a credit or debit card company, a manufacturer, a service provider, a retailer, a payment processors, a transaction processors, or a merchant network.

9. The paperless coupon system of claim 1, wherein the coupon comprises at least one of a face value discount, a portion of the face value discount, or a multiple value of the face value discount.

10. A method of providing paperless coupons, comprising:
    using an accessible communication network, registering at least one of a credit, charge, or debit card with a first offeree user account, and optionally, registering the offeree user account with a separate offeree deposit account;
    as performed using a computer, generating a plurality of paperless coupons, wherein the paperless coupons are issued by at least one of an issuer of the at least one of a credit, charge, or debit card, by an acceptor of the at least one of a credit, charge, or debit card, and by partners of the issuer of the at least one of a credit, charge, or debit card or partners of the acceptor of the at least one of a credit, charge, or debit card; wherein the coupons are sourced by a network of cooperative databases corresponding to multiple manufacturers and service providers and wherein the coupons linked thereto are for redemption at multiple different retailers where the at least one credit, charge, or debit card is accepted for payment;
    associating the paperless coupons generated to the at least one registered credit, charge or debit card via the issuer, an item manufacturer, or payment acceptor of the registered card; and
    tracking a purchase transaction using the registered credit, charge, or debit card, and applying the paperless coupons via the at least one credit, charge, or debit card that correspond to items or services that were purchased, wherein the applying occurs after the purchase transaction and comprises: a deposit or a credit of savings corresponding to a value of each applied paperless coupon to the first offeree user account, or a deposit or credit of savings corresponding to a value of each applied paperless coupon into one of the following: a second offeree user account and the offeree deposit account, wherein the deposit or credit of savings appears on a periodic statement of purchase activity for the offeree user account.

11. The method of claim 10, wherein the coupons are non-specific to a particular retailer.

12. The method of claim 10, wherein the at least one of a credit, charge, or debit card is registered on a website, or other accessible network, via the registration component.

13. The method of claim 10, wherein the coupon display component displays the coupons on-screen via a website, or other accessible network.

14. The method of claim 10, wherein coupons are linked to the first offeree user account associated with the at least one registered credit, charge or debit card via the coupon selection component.

15. The method of claim 10, wherein the issuer of the credit, charge, or debit card comprises a financial institution, a credit or debit card company, a manufacturer, a service provider, or a retailer.

16. The method of claim 10, wherein the acceptor of the credit, charge, or debit card comprises a Financial Institution, a credit or debit card company, a manufacturer, a service provider, or a retailer.

17. The method of claim 10, wherein the partner of the issuer or of the acceptor of the credit, charge, or debit card comprises a Financial Institution, a credit or debit card company, a manufacturer, a service provider, a retailer, a payment processors, a transaction processors, or a merchant network.

18. The method of claim 10, wherein the coupon comprises at least one of a discount value, a portion of the discount value, or a multiplied value of the discount value.

19. The method of claim 10, wherein the first offeree user account is associated with any one of a credit card account, a debit card account, a bank account, a charge account, a savings account, and a deposit account; the second offeree user account is associated with any one of the credit card account, debit card account, bank account, charge account, savings account, and deposit account; and the offeree deposit account is associated with any type of account that accepts deposits and credits.

20. The method of claim 10, wherein the first and the second offeree user accounts are associated with at least one the following: the same account or different accounts.

* * * * *